United States Patent
Meller et al.

(10) Patent No.: US 10,277,163 B1
(45) Date of Patent: Apr. 30, 2019

(54) MAGNETIC PARKING FOR ROBOTIC CLEANER ON A SOLAR PANEL

(71) Applicant: Evermore United S.A., Road Town, Tortola (VG)

(72) Inventors: Moshe Meller, New York, NY (US); Eran Meller, New York, NY (US)

(73) Assignee: EVERMORE UNITED S.A., Tortola (VG)

( * ) Notice: Subject to any disclaimer, the term of this patent is extended or adjusted under 35 U.S.C. 154(b) by 0 days.

(21) Appl. No.: 16/032,686

(22) Filed: Jul. 11, 2018

(51) Int. Cl.
| | |
|---|---|
| *H02S 40/10* | (2014.01) |
| *B08B 1/02* | (2006.01) |
| *B08B 3/08* | (2006.01) |
| *B08B 5/02* | (2006.01) |
| *B08B 5/04* | (2006.01) |
| *B08B 1/00* | (2006.01) |

(52) U.S. Cl.
CPC ............ *H02S 40/10* (2014.12); *B08B 1/002* (2013.01); *B08B 1/005* (2013.01); *B08B 3/08* (2013.01); *B08B 5/02* (2013.01); *B08B 5/04* (2013.01)

(58) Field of Classification Search
CPC ......... H02S 40/10; B08B 1/002; B08B 1/005; B08B 3/08; B08B 5/02; B08B 5/04
USPC .......................................................... 15/319
See application file for complete search history.

(56) References Cited

U.S. PATENT DOCUMENTS

| | | | |
|---|---|---|---|
| 8,342,281 B2 * | 1/2013 | Rooney, III | B63B 59/10 180/164 |
| 8,393,421 B2 * | 3/2013 | Kornstein | B63B 59/08 180/9.1 |
| 9,168,786 B2 * | 10/2015 | Schlee | B60B 39/00 |
| 9,254,898 B2 * | 2/2016 | Rooney, III | B63B 59/10 |
| 9,440,717 B2 * | 9/2016 | Rooney, III | B63B 59/10 |
| 9,455,665 B1 | 9/2016 | Meller et al. | |
| 2012/0152877 A1 * | 6/2012 | Tadayon | B25J 5/02 212/224 |
| 2014/0230711 A1 * | 8/2014 | Lovelace | B63B 59/08 114/222 |
| 2015/0236640 A1 | 8/2015 | Miyake et al. | |
| 2015/0272413 A1 | 10/2015 | Miyake et al. | |
| 2016/0052027 A1 * | 2/2016 | Chin | B08B 1/00 134/6 |
| 2017/0129602 A1 * | 5/2017 | Alduaiji | B25J 9/1679 |
| 2018/0212558 A1 * | 7/2018 | Meller | H02S 40/10 |
| 2018/0212559 A1 * | 7/2018 | Meller | B08B 1/00 |

* cited by examiner

*Primary Examiner* — Marc Carlson
(74) *Attorney, Agent, or Firm* — Brown Rudnick LLP

(57) ABSTRACT

Autonomous robotic cleaner (ARC) for cleaning solar panels having an anchoring mechanism including at least one rechargeable power source, at least one cleaning mechanism, a controller and an anchoring mechanism, the cleaning mechanism for cleaning dirt off of a surface of the solar panels, the controller for controlling a cleaning process of the ARC and the anchoring mechanism for magnetically anchoring the ARC to an anchoring surface coupled with a solar panel, the anchoring mechanism including an arm and a drive mechanism, the arm including at least one ferromagnetic end piece and the drive mechanism being coupled with the arm, wherein the drive mechanism moves the arm between a magnetically engaged position with the anchoring surface and a magnetically disengaged position with the anchoring surface.

23 Claims, 5 Drawing Sheets

US 10,277,163 B1

MAGNETIC PARKING FOR ROBOTIC CLEANER ON A SOLAR PANEL

FIELD OF THE DISCLOSED TECHNIQUE

The disclosed technique relates to solar panel technology, in general, and to methods and systems for parking and docking robotic cleaners of solar panels, in particular.

BACKGROUND OF THE DISCLOSED TECHNIQUE

The challenges of global climate change and energy circuitry demands have made the development of renewable energy alternatives vital for the future of mankind. The use of direct sun radiation on solar panels can potentially produce more than enough energy to meet the energy needs of the entire planet. As the price of solar power decreases and the pollution caused by conventional fuels rises, the solar business has entered a new era of worldwide growth.

In order to bring technologies to exploit solar energy one step closer and up to par with conventional fuels, the efficiency rate of solar systems must improve. Solar panel efficiency depends amongst other things on the cleanliness of their surface. Energy losses caused by dust and soiling can reach over 40%. In desert areas, where many solar parks are located, the soiling and dust problem is significant.

A fast growing type of solar park is the solar tracker park. The solar trackers have the ability to follow the sun's position continuously from morning to evening by changing their tilt angle from east (in the morning) to west (in the evening) in order to increase efficiency. Automatic cleaning solutions for solar trackers usually involve high volumes of water and/or the installation of special grids in the solar tracker park for moving automatic cleaners from solar tracker to solar tracker. Such solutions are not cost effective and require added labor for installation.

Autonomous robotic cleaners (herein abbreviated ARCs) for cleaning the surface of solar panels and solar trackers are known in the art. Examples of such systems are described in U.S. Pat. No. 9,455,665, US patent application publication no. 2015/0272413 and US patent application publication no. 2015/0236640. ARCs equipped with rechargeable batteries need to be periodically recharged and also require a docking bay or parking location when not in use, for example during daytime hours when solar panels are generating electricity. In general, there is a tradeoff between the weight of an ARC and its stability on the surface of a solar panel and in a parking location, especially in high wind conditions. As the weight of an ARC increases it will be more stable on the surface of a solar panel, even at an angle and even during windy conditions, however if the weight is too heavy, the movement of the ARC might crack or damage the surface of a solar panel or any coatings covering the surface of a solar panel. A lighter ARC can be more cost effective due to less raw materials used in production and will not damage the surface of a solar panel. However such an ARC might fall off a solar panel more easily in heavy winds, might dislodge from a parking bay or docking station in strong and windy conditions or might be blown over the surface of a solar panel, causing damaging to the solar panel, to other components in the solar park where the solar panel is located or even to people or workers in the vicinity. There is thus needed a system and method for parking an ARC in high wind conditions and inclement weather conditions such that the ARC will not fall off or be blown over a solar panel during cleaning and will not dislodge from a parking bay or docking station even when gusty winds and inclement weather are present.

SUMMARY OF THE DISCLOSED TECHNIQUE

The disclosed technique overcomes the disadvantages of the prior art by providing a novel and inventive system and mechanism for anchoring an autonomous robotic cleaner with an anchoring station coupled with a solar panel. According to one aspect of the disclosed technique there is thus provided an autonomous robotic cleaner (ARC) for cleaning solar panels having an anchoring mechanism. The ARC includes at least one rechargeable power source, at least one cleaning mechanism, a controller and an anchoring mechanism. The cleaning mechanism is for cleaning dirt off of a surface of the solar panels, the controller is for controlling a cleaning process of the ARC and the anchoring mechanism is for magnetically anchoring the ARC to an anchoring surface coupled with a solar panel. The anchoring mechanism includes an arm and a drive mechanism. The arm includes at least one ferromagnetic end piece and the drive mechanism is coupled with the arm. The drive mechanism moves the arm between a magnetically engaged position with the anchoring surface and a magnetically disengaged position with the anchoring surface.

According to another aspect of the disclosed technique there is thus provided a solar tracker cleaning system for cleaning solar panels of a solar tracker under varying weather conditions, with the solar tracker being able to be positioned at a pre-determined angle. The solar tracker cleaning system includes a plurality of ferromagnetic anchoring stations, an autonomous robotic cleaner (ARC) and a master controller. The anchoring stations are coupled with at least one edge of the solar tracker and the master controller is for receiving and transmitting data to and from the solar tracker and the ARC. The ARC includes at least one rechargeable power source, at least one cleaning mechanism, a controller and an anchoring mechanism. The cleaning mechanism is for cleaning dirt off of a surface of the solar panels, the controller is for controlling a cleaning process of the ARC and the anchoring mechanism is for magnetically anchoring the ARC to at least one of the ferromagnetic anchoring stations. The anchoring mechanism includes an arm and a drive mechanism. The arm includes at least one ferromagnetic end piece and the drive mechanism is coupled with the arm. The drive mechanism moves the arm between a magnetically engaged position and a magnetically disengaged position with at least one of the ferromagnetic anchoring stations. The master controller determines a weather condition and provides a clean command to the ARC if the determined weather condition is below a predetermined threshold. The master controller provides an anchoring command to the ARC to anchor in one of the ferromagnetic anchoring stations if the determined weather condition is above the predetermined threshold.

According to a further aspect of the disclosed technique there is thus provided a fixed angle solar panel cleaning system for cleaning solar panels under varying weather conditions, with the solar panels being positioned at a pre-determined angle. The fixed angle solar panel cleaning system includes a plurality of ferromagnetic anchoring stations, an autonomous robotic cleaner (ARC) and a master controller. The ferromagnetic anchoring stations are coupled with at least one edge of the solar panels and the master controller is for receiving and transmitting data to and from the ARC. The ARC includes at least one rechargeable power source, at least one cleaning mechanism, a controller and an anchoring mechanism. The cleaning mechanism is for cleaning dirt off of a surface of the solar panels, the controller is for controlling a cleaning process of the ARC and the anchoring mechanism is for magnetically anchoring the ARC to at least one of the ferromagnetic anchoring stations. The anchoring mechanism includes an arm and a drive mechanism. The arm includes at least one ferromagnetic end piece and the drive mechanism is coupled with the arm. The drive mechanism moves the arm between a magnetically engaged position and a magnetically disengaged position with at least one of the ferromagnetic anchoring stations. The master controller determines a weather condition and provides a clean command to the ARC if the determined weather condition is below a predetermined threshold. The master controller provides an anchoring command to the ARC to anchor in one of the ferromagnetic anchoring stations if the determined weather condition is above the predetermined threshold.

According to another aspect of the disclosed technique, the cleaning mechanism is selected from the list consisting of a cleaning mechanism utilizing water, a cleaning mechanism utilizing a cleaning agent, a cleaning mechanism utilizing a liquid, a cleaning mechanism utilizing vacuum, a cleaning mechanism including brushes, a cleaning mechanism including microfiber fins, a cleaning mechanism generating a directional air flow, a cleaning mechanism generating a pressurized air stream and a cleaning mechanism including at least one wiper.

According to a further aspect of the disclosed technique, the drive mechanism is selected from the list consisting of a drive motor including a rotating shaft, an electronic piston, an actuator, a worm gear including a bolt and a nut wheel, a solenoid, a hydraulic piston, a hydraulic motor, a pneumatic compressor and a pneumatic piston.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
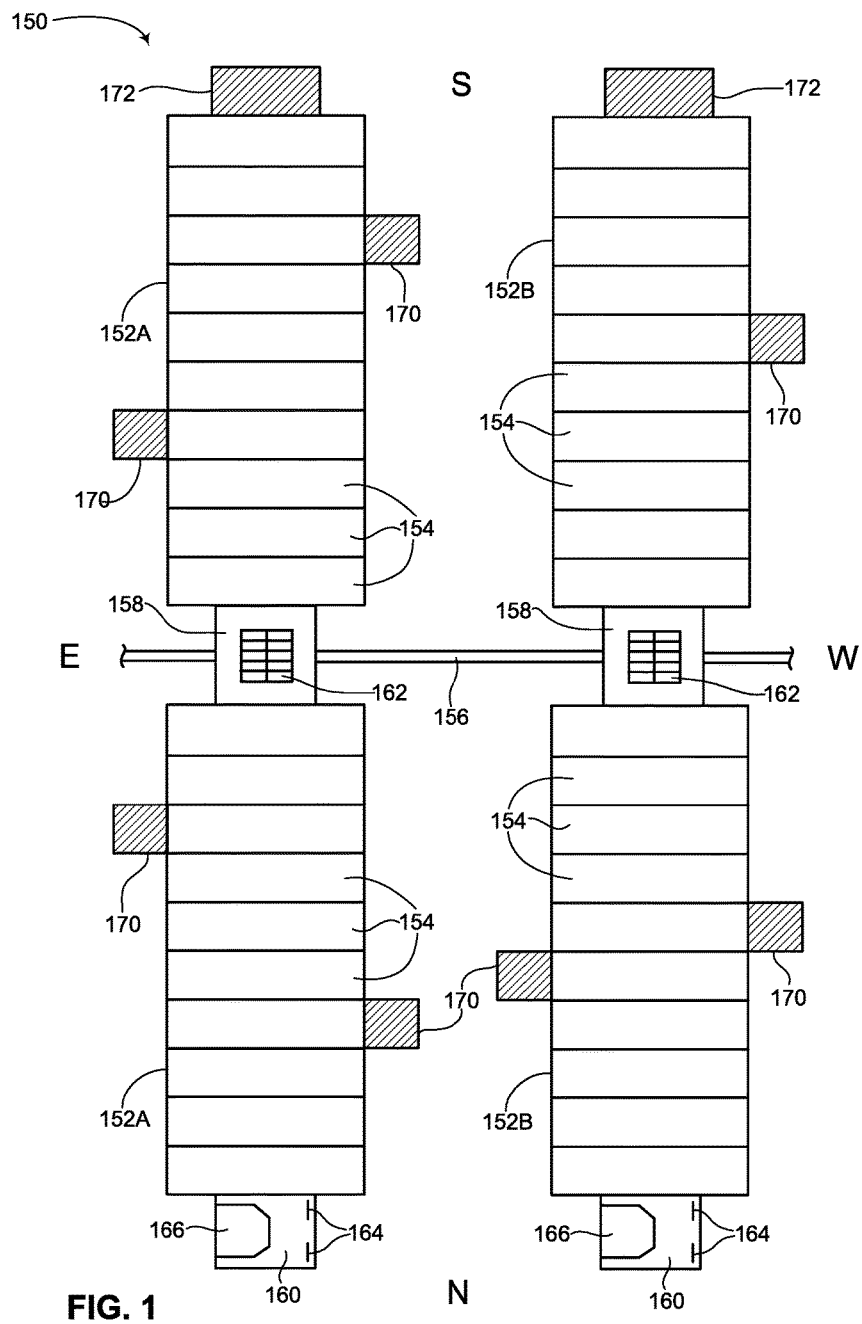
FIG. 1 is a top view of a solar tracker with ferromagnetic parking stations, constructed and operative in accordance with an embodiment of the disclosed technique.

The disclosed technique overcomes the disadvantages of the prior art by providing a ferromagnetic docking bay and ferromagnetic parking station configuration on a solar tracker and an autonomous robotic cleaner (herein abbreviated ARC) equipped with a magnetic arm that can engage and disengage with either the ferromagnetic docking bay, the ferromagnetic parking station or both. According to the disclosed technique, a strong magnetic coupling is made between the ARC and an anchoring station (parking bay, docking station and the like) such that the ARC can remain firmly coupled even under heavy wind conditions and inclement weather such as rain, snow, thunder storms and the like. In one embodiment, the ARC is equipped with a magnetic arm which includes a strong permanent magnet such that when engaged with the docking bay or the parking station, the ARC can remain firmly coupled via the magnetic arm even under harsh wind conditions, such as tornado class winds of 140 km/h or even faster. In another embodiment, the anchoring station includes a strong permanent magnet and the ARC includes a ferromagnetic arm which can magnetically couple with the permanent magnet of the anchoring station. The ARC is coupled wirelessly to a processor which can be coupled with a weather information station or other weather indicators in the vicinity of the solar tracker. During a cleaning cycle, when strong winds above a predetermined wind speed threshold are detected, a signal is sent to the ARC to travel to the closest docking bay or parking station and to engage its magnetic arm. The cleaning cycle can be continued once the strong winds and/or inclement weather dissipate and the detected wind speed is below the predetermined wind speed threshold. The predetermined wind speed threshold may be a peak gust wind speed, meaning suffice it for the wind speed to pass the threshold even for a short amount of time, such as a matter of seconds, and the anchoring signal may be provided to the ARC. The magnetic arm of the ARC may also form an electric connection with the docking station or parking bay such that the ARC can recharge its battery or power source when magnetically coupled. The electric connection can also be used to either transmit and/or receive information to and/or from a central processor. In another embodiment, the ARC may use a radio frequency (herein abbreviated RF) protocol or the global system for mobile communications (herein abbreviated GSM) protocol to wirelessly communicate with a master controller or central processor.

In general, the term ferromagnetic material as used throughout the description refers to any material possessing the mechanism through which permanent magnets are formed and/or material which is attracted to magnets. Examples of ferromagnetic materials include galvanized steel, cobalt, iron, ferric oxide, nickel, chromium dioxide, gadolinium, samarium-cobalt, neodymium, permalloy, magnetite and the like, including alloys and compositions of the above listed elements and compounds.

Reference is now made to FIG. 1, which is a top view of a solar tracker with ferromagnetic metal parking stations, generally referenced 150, constructed and operative in accordance with an embodiment of the disclosed technique. As shown are two solar tracker tables 152A and 152B. Solar tracker tables 152A and 152B are positioned in a north-south direction (as shown) such that they can tilt from east to west (also shown) during the course of a day. Many solar tracker tables include two sections, such as shown in FIG. 1, however solar tracker tables can include more than two sections (not shown), such as three, four, five, six or even more sections, each coupled to one another via a bridge. Each of solar tracker tables 152A and 152B are made up of a plurality of solar panels 154. Plurality of solar panels 154 may be covered with an anti-reflective coating (not shown)

for increasing solar energy production efficiency. According to the disclosed technique, the two sections of each solar tracker are coupled together via a bridge 158. Bridge 158 may be equipped with a solar panel 162 for generating electricity for charging the rechargeable power source of the ARC of the disclosed technique, as explained below. Bridge 158 is made from a ferromagnetic material. Solar panel 162 is different than plurality of solar panels 154 which make up each solar tracker table as the electricity generated from plurality of solar panels 154 is used by the solar tracker park to store electricity that can be sold to clients where the electricity generated from solar panel 162 is used to recharge and power the ARC of the disclosed technique. The solar park where solar tracker tables 152A and 152B are located in might also be coupled with an electric grid, for example of a town or municipality, with the electricity generated from plurality of solar panels 154 being transferred via converters to the electric grid. In addition, one of the sections of solar tracker tables 152A and 152B may be equipped with a docking station 160. Docking station 160 may be located on the northern side or the southern side of the solar tracker table depending on which hemisphere the solar tracker table of the disclosed technique is installed in. As shown in FIG. 1, docking station 160 is located on the northern side of the solar tracker table. Docking station 160 includes a plurality of anchoring elements 164 and a charging assembly (not shown in FIG. 1) for housing an ARC 166, which is merely shown schematically in FIG. 1. Docking station 160 may be made from a ferromagnetic material. Details of ARC 166 are provided below in FIGS. 2A, 2B and 3. In one embodiment, plurality of anchoring elements 164 enable ARC 166 to be anchored to docking station 160 during periods of inclement weather. Plurality of anchoring elements 164 may form part of the charging assembly (not shown) such that ARC 166 can be anchored and recharged simultaneously. Plurality of anchoring elements 164 is optional and does not need to be included in docking station 160. Solar trackers 152A and 152B also include a plurality of parking stations 170 and 172. Parking stations 170 and 172 can also be referred to as parking bays or parking docks. Parking stations 170 and 172 may be made from a ferromagnetic material. As shown, plurality of parking stations 170 and 172 can be located on the eastern or western side of a solar tracker (parking stations 170) and/or on the southern side (or opposite side of docking station 160) of the solar tracker (parking stations 172). Docking station 160 may be the preferred resting place for ARC 166 during daylight source when solar trackers 152A and 152B are producing electricity however each one of parking stations 170 and 172 along with docking station 160 can be used as a magnetic anchoring station for ARC 166. Parking stations 170 and 172 may be electrically coupled with solar panel 162 and as explained below, when ARC 166 parks in one of parking stations 170 and 172, ARC 166 can be electrically coupled with solar panel 162 for recharging the rechargeable power source or battery (not shown) of ARC 166.

As an autonomous robot, ARC 166 can move in a variety of patterns and paths over the surface of a solar tracker, for example in a zigzag path, sweeping path, raster scan path (all not shown) and the like, for cleaning the entire surface of solar trackers 152A and 152B. In general, when ARC 166 cleans the surface of solar trackers 152A and 152B, the solar trackers are brought to a horizontal angle of between +10° to −10° and preferably to a horizontal angle of substantially 0° degrees. At such an angle range under calm weather conditions ARC 166 can clean the surface of the solar panels without worry of falling off due to light or moderate winds or due to the angle at which the solar trackers are positioned. It is noted that when solar tracker tables 152A and 152B are installed, they are preferably positioned in a north-south direction however the actual direction of solar tracker tables 152A and 152B is dependent on the instruments and calibration used when installed. For example, solar tracker tables 152A and 152B may be installed with docking station 160 facing magnetic north, true north or a deviation from one of those directions, depending on the instruments used during the solar tracker installation and how they were calibrated (or miscalibrated).

In the embodiment shown in FIG. 1, docking station 160, bridge 158 and plurality of parking stations 170 and 172 are each made from a ferromagnetic metal, such as iron, steel, galvanized metal (i.e., a metal coated with zinc) and the like. It is noted that in general, solar trackers 152A and 152B along with plurality of solar panels 154 are all made from materials such as aluminum, plastic and glass, in other words, materials which are not ferromagnetic. This is the preferred construction of solar panels. However in a further embodiment of the disclosed technique, the solar panels of the solar trackers may be made from ferromagnetic materials, such as stainless steel or galvanized steel and the anchoring surfaces (i.e., the docking station, parking stations and bridge) are made from non-ferromagnetic materials. As described below, ARC 166 is equipped with a magnetic arm (not shown) for magnetically coupling ARC 166 with any one of docking station 160, bridge 158 and plurality of parking stations 170 and 172. The magnetic connection of the magnetic arm is strong and could potentially damage plurality of solar panels 154 if engaged. However since solar panels 154 and solar trackers 152A and 152B are in general not made from magnetic materials there is little worry that the magnetic arm will be engaged on the surface of solar panels 154 since the magnetic arm will not anchor ARC 166 on those surfaces. Docking station 160, bridge 158 and plurality of parking stations 170 and 172 may each also have a connection, either wired or wirelessly, with a central processor (not shown) of the solar park in which solar trackers 152A and 152B are located in. When ARC 166 parks in one of docking station 160, bridge 158 or plurality of parking stations 170 and 172, ARC 166 may be able to transfer data via this connection to the central processor.

As shown, plurality of parking stations 170 are positioned at various locations around plurality of solar panels 154 such that regardless of where ARC 166 is located on the surface of solar panels 154, it is always sufficiently close to a location where it can park and quickly anchor in the event of inclement weather, in a matter of a few seconds. In general, during daylight hours solar trackers 152A and 152B follow the movement of the sun in the horizon and generate electricity and during nighttime hours, ARC 166 moves over the surface of solar panels 154 and cleans the surface of dirt, dust and debris to keep energy efficiency of solar panels 154 at an optimum level. Solar trackers 152A and 152B may be in a solar park (not shown) containing a plurality of solar trackers, with the solar park usually located in an open area away from natural structures (such as mountains and valleys) and manmade structures (such as tall buildings and bridges) that might cast a shadow on the surface of solar panels 154. Such open areas can be subject to inclement weather and in the case of desert areas in particular, the inclement weather can include strong and harsh wind conditions, including tornado-like wind speeds reaching speeds of 140 km/h and even higher. Such wind speeds can cause ARC 166 to fall off of solar panels 154 during a cleaning cycle, might cause ARC 166 to dislodge from docking station 160 and can cause ARC 166 to fall and tumble over the surface of solar panels 154 thus causing damage to the solar panels and other elements of the solar park. ARC 166 might even be blown off the surface of solar panels 154 thereby causing damage to workers or people in the vicinity of the solar park. As mentioned above, prior art solutions have not been successful in preventing an ARC from remaining in its parking bay or station under harsh and strong wind conditions such as tornado-like wind speeds.

According to the disclosed technique, and as detailed below in FIGS. 2A, 2B and 3, ARC 166 is equipped with a magnetic arm made from a strong magnet, such as a rare earth metal magnet or any known rare earth metal magnetic material. ARC 166 may be equipped with a wireless transceiver (not shown) and the solar park in which solar trackers 152A and 152B are located in may include a central processor (not shown) which is coupled with a weather information center and/or may include weather instruments such as barometers, hygrometers, anemometers, thermometers and the like for determining weather conditions in the vicinity of the solar park. During a cleaning cycle when ARC 166 is travelling over the surface of solar panels 154, the weather information center and/or the weather instruments continuously monitor the weather conditions in the vicinity of the solar park. A predetermined wind speed threshold or other threshold inclement weather indicator (such as rains, lightning storms, snow and the like) may be programmed such that if the weather information center and/or the weather instruments determine that such a threshold has been attained, a signal is sent to ARC 166 to cease its cleaning cycle immediately and to anchor and park in one of docking station 160, bridge 158 or parking stations 170 and 172 until the inclement weather subsides and the determined weather conditions in the vicinity of the solar park is below the predetermined wind speed threshold or inclement weather threshold. The predetermined wind speed threshold might be winds with a speed of 100 km/h, 120 km/h, 140 km/h or any other wind speed deemed strong enough to potentially cause ARC 166 to fall off the surface of solar panels 154 and/or to cause damage to the solar panels or surrounding areas. As the disclosed technique applies to any kind of autonomous robotic cleaner that can move over the surface of a solar panel autonomously, the predetermined wind speed threshold and/or inclement weather threshold is a design parameter which may be specific to the design, size, shape and weight of the ARC and can be determined by the worker skilled in the art. The above mentioned thresholds might also be a function of the physical and environmental location of where the solar park is located and the kind of inclement weather experienced by the solar park. ARC 166 is equipped with encoders (not shown) and/or sensors (not shown) for determining its location on the surface of solar panels 154. When ARC 166 receives a stop cleaning cycle signal due to inclement weather, a processor (not shown) in ARC 166 or the central processor of the solar park, may determine a closest parking location for anchoring ARC 166 until the inclement weather passes. As mentioned above, the anchoring locations may include docking station 160, bridge 158 and parking stations 170 and 172. Known shortest path algorithms can be used to determine which anchoring location is closest and where ARC 166 should travel to get to the closest anchoring station. Once in an anchoring station, ARC 166 engages its magnetic arm to magnetically coupled ARC 166 with the anchoring station. As mentioned above, all the possible anchoring stations on solar trackers 152A and 152B are ferromagnetic surfaces. The magnetic connection made by the attraction between the anchoring surface and ARC 166 is strong enough such that ARC 166 remains parked and coupled with the anchoring surface even under harsh weather conditions and high speed winds. For example, the magnetic connection may be strong enough that a horizontal force of 15 kilogram-force is required to dislodge the magnetic connection in a horizontal direction. As another example, a vertical force equivalent to the weight of ARC 166 plus the force of another 12 kilogram-force is required to dislodge the magnetic connection in a vertical direction. When anchored, since an electric connection between ARC 166 and the anchoring surface may also be made via the magnetic arm, the rechargeable battery of ARC 166 may be recharged. The rechargeable battery of ARC 166 may be recharged using energy collected by solar panel 162 and stored in a battery cell (not shown). Once the inclement weather has subsided as indicated by the weather information center and/or the weather instruments coupled with the solar park, ARC 166 may be provided with a resume cleaning cycle signal from the central processor or its own processor. The previous location of ARC 166 may be stored such that ARC 166 can resume cleaning the surface of solar panels 154 where it left off.

As mentioned above, the anchoring surfaces including docking station 160, bridge 158 and parking stations 170 and 172 can be made from any ferromagnetic material or can be made from a non-ferromagnetic material but may include at least one permanent magnet. In one embodiment of the disclosed technique, the ferromagnetic material is made to be permanently magnetic such that ARC 166 merely has to engage its ferromagnetic arm on an anchoring surface in order to park and anchor. In another embodiment of the disclosed technique, each anchoring station includes at least one permanent magnet with the ARC including a ferromagnetic arm that can be engaged to couple the ARC with the permanent magnet of the anchoring surface. In a further embodiment of the disclosed technique, the anchoring surface may be made from an electromagnetic material such that it presents strong magnetic properties only when an electric current is provided to the anchoring surface. In this embodiment, each anchoring surface is coupled with a source of electricity. When a stop cleaning cycle signal is provided to ARC 166 to stop cleaning because of inclement weather, a similar signal is provided to send electricity to each anchoring surface thereby causing an electromagnetic effect to take hold and for each anchoring surface to be magnetized. When a resume cleaning signal is provided to each ARC, a similar signal is provided to cease sending electricity to each anchoring surface. In this embodiment, permanent magnets may be added to the anchoring surfaces such that the ARC can engage its ferromagnetic arm. As mentioned above, in a further embodiment of the disclosed technique, the solar panels may be made from non-magnetic materials whereas the anchoring surfaces may include permanent magnets and the ARC may include a ferromagnetic arm that can couple with the magnets of the anchoring surfaces.

Figure 2A:
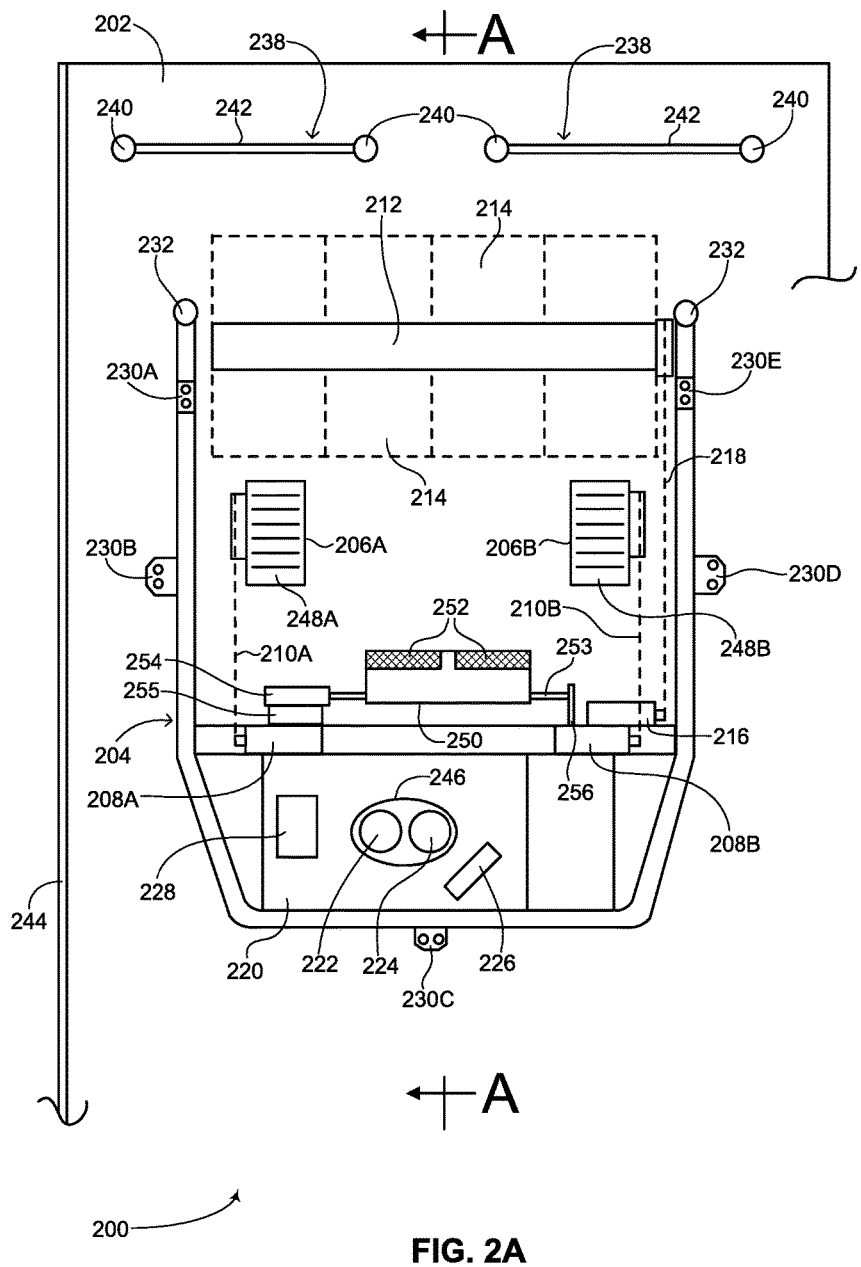
FIG. 2A is a bottom view of an autonomous robotic cleaner including a first embodiment of a magnetic parking arm, constructed and operative in accordance with another embodiment of the disclosed technique.

Reference is now made to FIG. 2A, which is a bottom view of an autonomous robotic cleaner including a first embodiment of a magnetic parking arm, generally referenced 200, constructed and operative in accordance with another embodiment of the disclosed technique. FIG. 2A shows a first docking station 202 and an ARC 204, which are substantially similar to docking station 160 and ARC 166 (FIG. 1) respectively yet shown in greater detail. ARC 204 may have a plastic body or may be made from other materials (not shown). ARC 204 includes a left drive wheel 206A, a right drive wheel 206B, a left direct current (herein abbreviated DC) drive motor 208A and a right DC drive motor 208B. Left drive wheel 206A includes a left wheel encoder 248A and right drive wheel 206B includes a right wheel encoder 248B. A left drive belt 210A couples left drive wheel 206A to left DC drive motor 208A such that left DC drive motor 208A can drive left drive wheel 206A. A right drive belt 210B couples right drive wheel 206B to right DC drive motor 208B such that right DC drive motor 208B can drive right drive wheel 206B. Left wheel and right wheel encoders 248A and 248B can be embodied as proximity sensors and can read the revolutions of each of left drive wheel 206A and right drive wheel 206B respectively. For example, left wheel and right wheel encoders 248A and 248B can count the number of links or ribs in either the drive wheels or the drive belts. In one example, the drive wheels may have 6 pulses per revolutions, 12 pulses per revolution, or any other number of pulses per revolution, where each pulse can be counted and read by left wheel and right wheel encoders 248A and 248B. Thus left wheel and right wheel encoders 248A and 248B can be used to determine the angular positions of left drive wheel 206A and right drive wheel 206B. Together with a control unit 220 (explained below), the wheel encoders enable the control of the turning as well as the linear motion of ARC 204 over the surface of a solar tracker. It is noted that left wheel and right wheel encoders 248A and 248B are optional components and can be embodied using other elements. For example, left DC drive motor 208A and right DC drive motor 208B may be off-the-shelf components having built-in encoders which use the Hall effect thereby obviating the need for additional encoders such as left wheel and right wheel drive encoders 248A and 248B. Such DC drive motors with built-in Hall effect encoders may have a simpler construction and higher resolution than the embodiment in which the encoders and the DC motors are separate. Additionally, Hall effect encoders are not affected by dust and debris and thus are an appropriate choice for an encoder in an ARC designed to remove dust, dirt and debris.

ARC 204 further includes a cleaning cylinder 212. A plurality of fins, for example a plurality of microfiber fins 214, is coupled with cleaning cylinder 212 for cleaning the surface of a solar tracker table. Plurality of microfiber fins 214 are used for pushing dirt off the surface of a solar tracker table by creating a directional air flow or stream over the surface of the solar panels of the solar tracker table. The direction air flow enables the pressure plurality of microfiber fins 214 exerts on the surface of the solar panels to be less than 0.1 g/cm$^2$, which should not damage the anti-reflective coating on the surface of the solar panels. As noted above, according to the disclosed technique, ARC 204 does not include nor does it require a vacuum bin for collecting debris and dirt or a filter. ARC 204 also includes a cleaning cylinder DC drive motor 216 and a cleaning cylinder drive belt 218 for coupling cleaning cylinder DC drive motor 216 with cleaning cylinder 212 for driving it. ARC 208 further includes a control unit 220 (which can also be referred to simply as a controller). Control unit 220 includes an at least 6-axis motion sensor 246, a swivel wheel 226 and a rechargeable power source 228. At least 6-axis motion sensor 246 includes an electronic gyroscope 222 and an accelerometer 224. At least 6-axis motion sensor 246 can also be embodied as a 9-axis sensor with the functioning of the magnetometer not being used. At least 6-axis motion sensor 246 can embodied as a motion sensor detecting more than six axes of movement. It is noted that swivel wheel 226 can be replaced with any supporting structure such as a brush, a piece of plastic, a piece of rubber and the like, for supporting the rear end of ARC 204. The supporting structure does not need to move or have moveable parts but should be smooth enough so as not to cause any damage to the surface of the solar tracker table as the ARC moves over its surface. Control unit 220 may also include a processor (not shown) and a wireless transmitter-receiver (not shown). Control unit 220 controls the operation of ARC 204, including receiving commands and transmitting information from the ARC (for example via the wireless transmitter-receiver) to a central controller (not shown). Accelerometer 224 can identify the tilt position as well as the movement of ARC 204. Electronic gyroscope 222 can identify the heading of ARC 204 while it is stationary or while it is moving. At least 6-axis motion sensor 246 is used by control unit 220 for navigating ARC 204 over the surface of a solar tracker table. It is noted that at least 6-axis motion sensor 246 can also be embodied as a 9-axis motion sensor, including a magnetometer (not shown) as well. At least 6-axis motion sensor 246 can be embodied using any known motion sensor that combines at least an accelerometer with an electronic gyroscope, for example the BNO080 9-axis SiP from Hillcrest Labs™ and other similar motion sensors. Swivel wheel 226 supports the rear portion of ARC 204 while allowing it full maneuverability. As mentioned above, swivel wheel 226 can be embodied as a support structure that does not involve a wheel and may be simply a piece of rubber or plastic. Rechargeable power source 228 may be a rechargeable battery, such as a 12 volt Ni-MH (nickel-metal hydride) battery but can also be embodied as other types of rechargeable batteries such as lead acid, lithium ion, LiFePO4, NiCad and the like. ARC 204 further includes a plurality of recharge connectors 232, as explained below.

In addition, ARC 204 includes at least one edge sensor, such as a proximity sensor, for identifying and determining an edge of a solar tracker table. In one example, as shown in FIG. 2A, ARC 204 includes five proximity sensors 230A-230E, however this is merely an example and any number of proximity sensors can be used. Due to the general dusty conditions under which autonomous cleaning robots are used to clean solar tracker tables, the edge sensor or proximity sensor may be preferably embodied as an ultrasonic proximity sensor however other types of sensors, such as IR sensors, capacitance sensors and the like, can be used. As mentioned above, the proximity sensors are used with control unit 220 to prevent ARC 204 from falling off the side of the solar tracker table and also for allowing ARC 204 to move accurately along the edges of the solar tracker table. A cross-sectional view of ARC 204 along line A-A is shown below and explained in FIG. 2B.

FIG. 2A also shows the components of first docking station 202, including a plurality of anchoring elements 238 and a physical barrier 244. Physical barrier 244 may be specifically positioned on the northern side of first docking station 202 (in a northern hemisphere installation) for use in calibrating electronic gyroscope 222 at the start of a cleaning process, as described below. In a southern hemisphere installation, the physical barrier may be positioned on the southern side of the docking station. Plurality of anchoring elements 238 is substantially similar to plurality of anchoring elements 164 (FIG. 1). The anchoring elements are used for anchoring and recharging rechargeable power source 228 of ARC 204. Each one of plurality of anchoring elements 238 includes a conductive bar 242, which can be made from a conductive metal such as stainless steel alloy 316 or other alloys, as well as a plurality of supporting elements 240 coupled at the ends of each conductive bar. Conductive bar 242 is used to anchor and charge the ARC on the east side or the west side of first docking station 202. In one embodiment of the disclosed technique, first docking station 202 may include a plurality of anchoring elements on both the east side and the west side of the docking station. Supporting elements 240 are flexible, with each supporting element 240 including a spring (not shown) for ensuring proper conductivity for recharging rechargeable power source 228. As mentioned above ARC 204 includes a plurality of recharge connectors 232 for coupling ARC 204 with conductive bar 242. Plurality of recharge connectors 232 are coupled with rechargeable power source 228. Also as mentioned above, first docking station 202 may include physical barrier 244, which may be embodied as a vertical wall, for stopping ARC 204 while it moves into first docking station 202. Physical barrier 244 can also be used in the calibration process of at least 6-axis motion sensor 246, in particular in calibrating electronic gyroscope 222.

As mentioned above, plurality of anchoring elements 238 and plurality of recharge connectors 232 are optional elements. As shown in FIG. 2A, ARC 204 further includes a parking arm 250 having magnetic end pieces 252, a parking arm DC gear motor 254, a parking arm shaft 253, a parking motor support 255 and a parking shaft support 256. These elements (250, 252, 253, 254, 255 and 256) together can be referred to as an anchoring mechanism. Parking arm shaft 253 is coupled with parking arm 250, with one end being coupled with parking shaft support 256 and the other end being coupled with parking arm DC gear motor 254. Parking shaft support 256 and parking motor support 255 are coupled with the frame of ARC 204 as shown in FIG. 2A. Parking arm DC gear motor 254 rotates parking arm 250 via parking arm shaft 253. Magnetic end pieces 252 can be made as rare earth metal magnets such as neodymium magnets or samarium-cobalt magnets or from rare earth metal magnetic materials however other materials for making permanent magnets can be used to make magnetic end pieces 252.

Parking arm DC gear motor 254 rotates parking arm shaft 253 90°, enabling parking arm 250 to be in one of two positions, either horizontally (disengaged) or vertically (engaged). In the horizontal position of parking arm 250, ARC 204 can clean the surface of a solar panel. In the vertical position of parking arm 250, ARC 204 can magnetically couple with a docking bay, bridge or parking station, as illustrated and described above in FIG. 1. In the vertical position, ARC 204 cannot move and as shown in greater detail below in FIG. 3, parking arm 250 is slightly longer than the vertical distance of swivel wheel 226 thereby lifting swivel wheel 226 off the surface of an anchoring surface and preventing ARC 204 from moving around when parked and anchored. As an example, parking arm DC gear motor 254 can have an RPM (revolutions per minute) of 5 or 6, meaning a full revolution is executed in about 10 seconds or a 90 degree revolution in about 2.5 seconds. In this example, parking arm 250 can be engaged and disengaged quickly in a matter of seconds. Other RPMs are possible and are a matter of design choice. In addition, the torque of parking arm DC gear motor 254 can be about 30 kg/cm to ensure a strong and quick magnetic coupling between parking arm 250 and an anchoring surface, however other torques are possible and are a matter of design choice depending on design considerations and factors of ARC 204. Using the above example of RPM and torque, ARC 204 as illustrated in FIG. 2A using a rare earth metal magnet as magnetic end pieces 252 can strongly couple with an anchoring surface and be firmly parked and anchored even under wind conditions as fast as 140 km/h. As mentioned above, if ARC 204 requires firm coupling at even faster winds, stronger or larger magnets can be used as magnetic end pieces 252. The anchoring mechanism in FIG. 2A as embodied by parking arm 250 as shown in FIG. 2A is merely one example of a magnetic anchoring mechanism for anchoring ARC 204 to an anchoring surface. Other embodiments of the parking arm of the disclosed technique, such as an electronic piston configuration, a worm gear configuration, an actuator configuration, a solenoid configuration, a hydraulic piston or hydraulic motor configuration, a pneumatic compressor configuration and a pneumatic piston configuration are possible. Each of these configurations can include an arm and a drive mechanism for moving the arm between a magnetically engaged position and a magnetically disengaged position. The various drive mechanisms can include at least one of a drive motor, an electronic piston, a worm gear, an actuator, a solenoid, a hydraulic piston, a hydraulic motor, a pneumatic compressor and a pneumatic piston. It is noted that other configurations for the drive mechanism and the anchoring mechanism are possible and are a matter of design choice. As a further example, the electronic piston and worm gear configurations are described below in greater detail, respectively in FIGS. 4 and 5, however other configurations are possible as mentioned above.

Parking arm shaft 253 may have a circular cross-section or a square cross-section. A square cross-section might be preferable as it should lead to more torque especially when magnetic end pieces 252 need to be disengaged from the anchoring surface. As shown, parking arm 250 might be made from plastic, another non-ferrous material or any other non-magnetic material, only having magnetic end pieces 252 being fabricated as a permanent magnet, for example for the purposes of cost effectiveness. The configuration of parking arm 250 as shown in FIG. 2A is only brought as an example. Parking arm 250 as shown is located centrally within ARC 204 between left drive wheel 206A and right drive wheel 206B, positioned also at a distance from plurality of microfiber fins 214. Parking arm 250 however can be placed anywhere on the underside of ARC 204 which does not interfere with the cleaning function of plurality of microfiber fins 214 and is not limited to the positioning as shown in FIG. 2A. In addition, as shown in FIG. 2A, parking arm DC gear motor 254 and parking arm shaft 253 are coupled with the frame (not labeled) of ARC 204 via parking shaft support 256 and parking motor support 255. Other configurations are possible for coupling parking arm DC gear motor 254 to the frame of ARC 204 and what is shown is merely a non-limiting example.

Figure 2B:
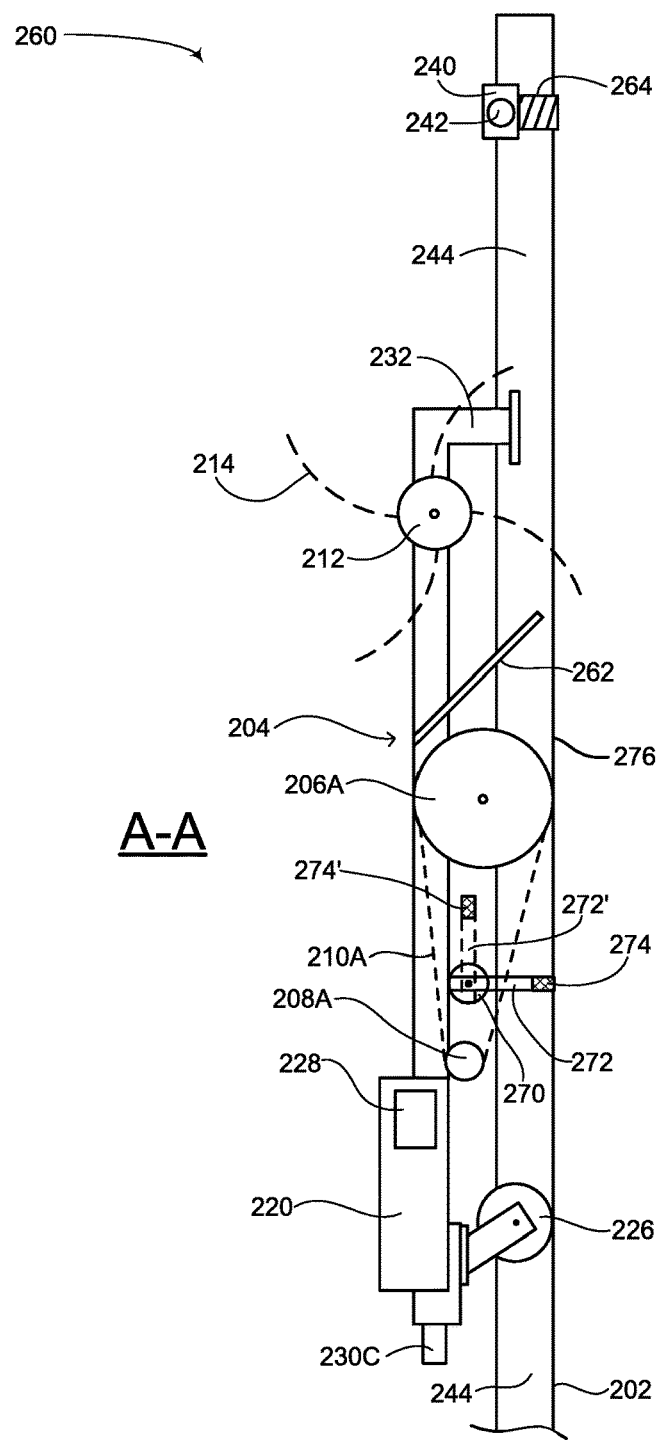
FIG. 2B is a side view of the autonomous robotic cleaner of FIG. 2A along a line A-A, constructed and operative in accordance with a further embodiment of the disclosed technique.

Reference is now made to FIG. 2B, which is a side view of the autonomous robotic cleaner of FIG. 2A along a line A-A, generally referenced 260, constructed and operative in accordance with a further embodiment of the disclosed technique. All elements and parts in FIG. 2B are shown and have been explained above in FIG. 2A except for a few. Therefore identical reference numbers are used in FIG. 2B for identical elements shown in FIG. 2A. FIG. 2B additionally shows a spring 264 which supports supporting element 240, enabling springiness and flexibility in supporting element 240 and conductive bar 242. Shown additionally is an angular flat element 262 positioned adjacent to cleaning cylinder 212 for improving the cleaning process by increasing the strength of the directional air flow generated by plurality of microfiber fins 214. Angular flat element 262 improves the cleaning process by directing the air flow generated by plurality of microfiber fins 214 forward and thus absorbs some of the dust particles which may fly backwards while cleaning cylinder 212 rotates plurality of microfiber fins 214. Angular flat element 262 makes the directional air flow of plurality of microfiber fins 214 powerful and strong and thereby reduces impact and pressure on the anti-reflective coating of the solar panels. As mentioned above, plurality of anchoring elements 238 (FIG. 2A) are optional and thus spring 264 which supports supporting element 240, and conductive bar 242 are optional components.

A parking arm shaft 270 (similar to parking arm shaft 253 in FIG. 2A) is shown having a circular cross-section, although as mentioned above, it may have a square or even rectangular cross-section. Parking arm shaft 270 couples a parking arm 272, 272' (similar to parking arm 250 in FIG. 2A) with a magnetic end piece 274, 274' (similar to magnetic end pieces 252). The parking arm is shown in a vertical, magnetically engaged position as parking arm 272 and magnetic end piece 274 and also in a horizontal, magnetically disengaged position as parking arm 272' and magnetic end piece 274'. In the horizontal position (shown using dotted lines), magnetic end piece 274' is not magnetically engaged with a ferromagnetic anchoring surface 276 and thus plurality of microfiber fins 214 can rotate and perform a cleaning function of a solar panel surface. In the vertical position (as shown), magnetic end piece 274 magnetically couples with and engages with ferromagnetic anchoring surface 276, thereby firmly coupling ARC 204 with ferromagnetic anchoring surface 276. Shown as well in FIG. 2B is the 90° movement made by parking arm shaft 270 of the parking arm from a vertical position to a horizontal position.

It is noted that in the vertical position, magnetic end piece 274 may electrically couple ferromagnetic anchoring surface 276 with control unit 220. For example, magnetic end piece 274 may include a wire connection (not shown) coupling it with control unit 220. In this respect, once a magnetic coupling is established with ferromagnetic anchoring surface 276, an electrical coupling is established as well. Therefore, when parking arm 272 is magnetically engaged, charge and current can be transferred to the rechargeable battery of ARC 204.

Figure 3:
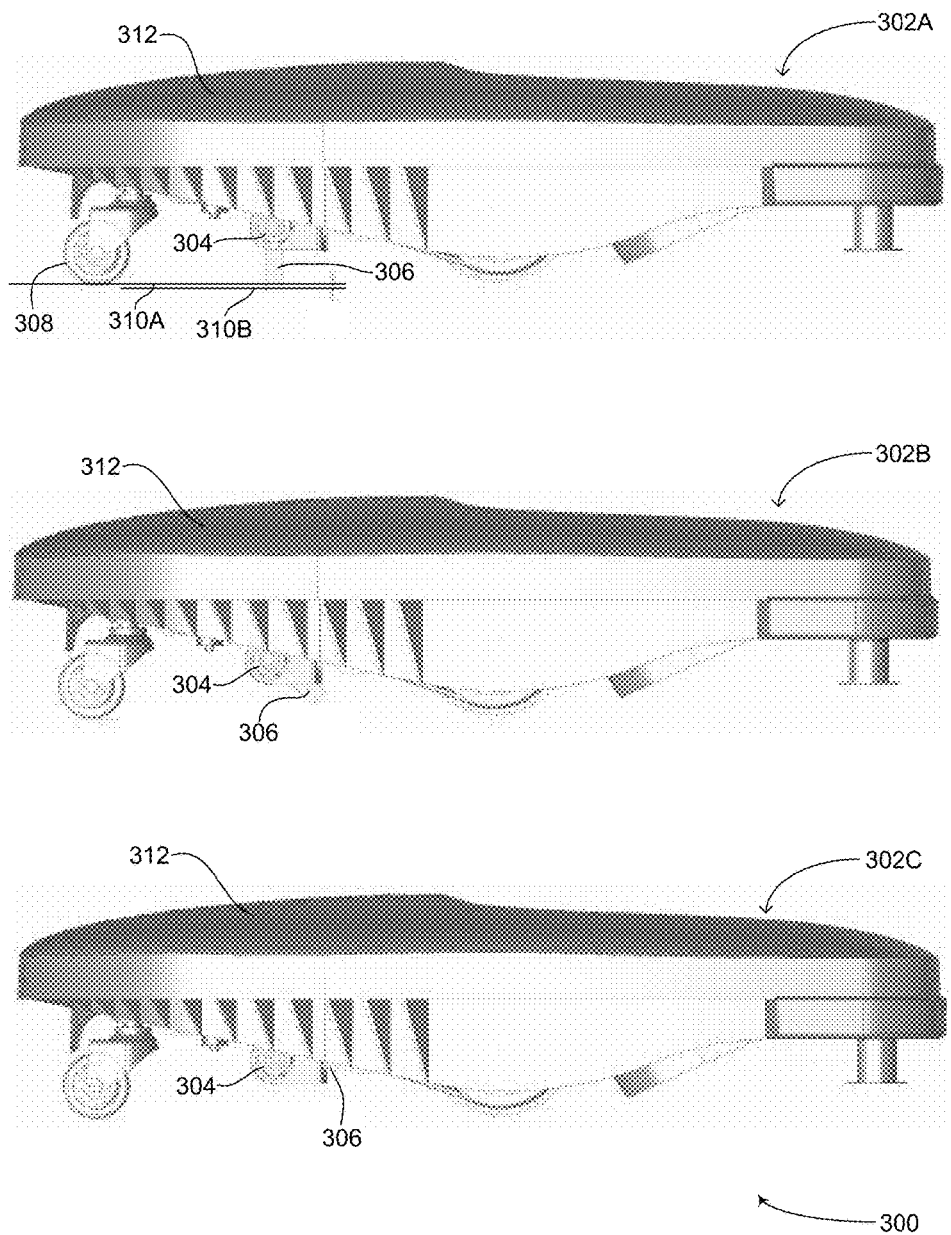
FIG. 3 is a set of side views of an autonomous robotic cleaner including a magnetic parking arm in various positions, constructed and operative in accordance with another embodiment of the disclosed technique.

Reference is now made to FIG. 3, which is a set of side views of an autonomous robotic cleaner including a magnetic parking arm in various positions, generally referenced 300, constructed and operative in accordance with another embodiment of the disclosed technique. A first side view 302A shows an ARC 312 with a parking arm 306 engaged with a ferromagnetic anchoring surface (not labeled). Parking arm 306 is coupled with a parking arm shaft 304 which can rotate parking arm 306 between a vertical position and a horizontal position. Most elements of ARC 312 are not labeled in order to not clutter FIG. 3 however FIG. 3 shows a swivel wheel 308. As mentioned above, first side view 302A shows ARC 312 with parking arm 306 in a vertical position. Parking arm 306 is slightly longer than the diameter of swivel wheel 308 such that when parking arm 306 is in the vertical position, swivel wheel 308 is slightly lifted off the surface of the solar panel or anchoring surface it is normally touching when moving and maneuvering around. As shown, a line 310A shows the plane on which swivel wheel 308 can rotate whereas a line 310B shows the plane on which parking arm 306 rests when engaged. Line 310B is slightly lower than line 310A thereby showing that when parking arm 306 is engaged, swivel wheel is slightly lifted off the surface of the anchoring surface (not shown). The distance between lines 310A and 310B may be as small as 3 millimeters. Other distances are also possible however the principle is that when parking arm 306 is engaged, swivel wheel 308 should be prevented from rotating and causing ARC 312 to move around when parking arm 306 is to magnetically coupled ARC 312 to an anchoring surface. This also ensures a good and firm magnetic connection between parking arm 306 and the ferromagnetic anchoring surface.

A second side view 302B shows ARC 312 with parking arm 306 half disengaged from the ferromagnetic anchoring surface. In this view, parking arm shaft 304 is in the process of rotating parking arm 306 into a horizontal position. A third side view 302C shows ARC 312 with parking arm 306 fully disengaged from the ferromagnetic anchoring surface. Swivel wheel now touches the magnetic anchoring surface and can move ARC 312 back onto the surface of a solar panel (not shown).

Figure 4:
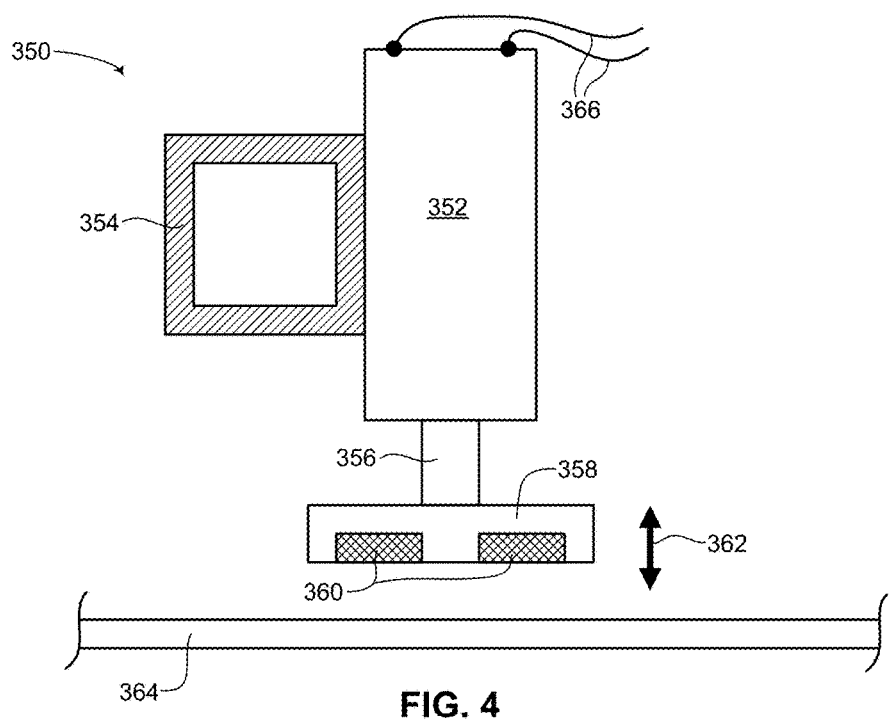
FIG. 4 is a side view of a second embodiment of a magnetic parking arm for use with an autonomous robotic cleaner, constructed and operative in accordance with a further embodiment of the disclosed technique.

Reference is now made to FIG. 4, which is a side view of a second embodiment of a magnetic parking arm for use with an autonomous robotic cleaner, generally referenced 350, constructed and operative in accordance with a further embodiment of the disclosed technique. Magnetic parking arm 350 is shown as an electronic piston or actuator which can move between two positions, a magnetically disengaged position (as shown) and a magnetically engaged position (not shown). Magnetic parking arm 350 includes an actuator 352, which can also be embodied as an electronic piston. Actuator 352 includes an extension 356 which moves in the direction of an arrow 362 to engage and disengage it with a ferromagnetic anchoring surface 364. Coupled with extension 356 is a non-magnetic plate 358 which includes two magnetic end pieces 360. Magnetic end pieces 360 can couple with ferromagnetic anchoring surface 364 when actuator 352 extends extension 356 in the direction of arrow 362 towards the anchoring surface such that magnetic end pieces 360 touch ferromagnetic anchoring surface 364. As mentioned above, non-magnetic plate 358 may include at least one magnetic end piece (not shown). In addition, the plate extending from the extension may be made from a ferromagnetic material (not shown) with the magnetic end pieces (as permanent magnets) being incorporated into the anchoring surface (not shown).

Actuator 352 is coupled with a main frame 354 of an ARC (not shown). A plurality of wires 366 electrically couple actuator 352 with the power source of the ARC. Actuator 352 moves extension 356 up and down in the direction of arrow 362 based on an electric current provided via plurality of wires 366. When the ARC is to anchor due to inclement weather or strong wind conditions, the ARC is given an anchor signal from a central processor or control unit to find the closest anchoring surface. Once the ARC is positioned on the closest anchoring surface, an electrical current is applied via plurality of wires 366 to engage magnetic parking arm 350 by activating actuator 352. Extension 356 may extend within a number of seconds. A second electrical current can be applied via plurality of wires 366 to disengage magnetic parking arm 350 by again activating actuator 352 in the opposite direction. Actuator 352 may be coupled with any sturdy section or part of the ARC and not necessarily with just main frame 354.

Figure 5:
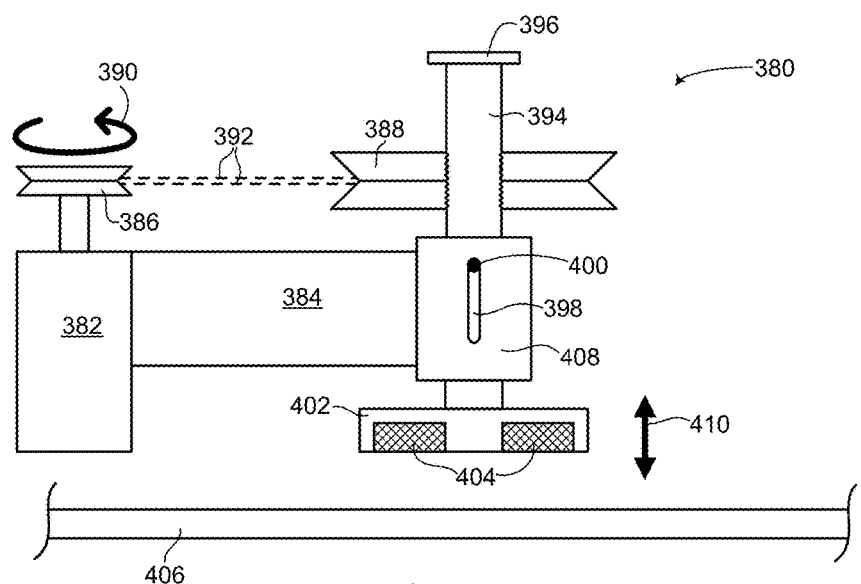
FIG. 5 is a side view of a third embodiment of a magnetic parking arm for use with an autonomous robotic cleaner, constructed and operative in accordance with another embodiment of the disclosed technique.

Reference is now made to FIG. 5, which is a side view of a third embodiment of a magnetic parking arm for use with an autonomous robotic cleaner, generally referenced 380, constructed and operative in accordance with another embodiment of the disclosed technique. Magnetic parking arm 380 is shown as a worm gear which can move between two positions, a magnetically disengaged position (as shown) and a magnetically engaged position (not shown). Magnetic parking arm 380 includes a bolt 394, a nut wheel 388, a bolt stopper 396, a guiding slot 398, a guiding pin 400, a bolt housing 408, a non-magnetic plate 402, two magnetic end pieces 404, a worm gear drive motor 382, a drive wheel 386 and a drive belt 392. Worm gear drive motor 382 and bolt housing 408 are both coupled with a main frame 384 of an ARC (not shown) for supporting magnetic parking arm 380. Worm gear drive motor 382 includes a shaft (not labeled) which is coupled to drive wheel 386 and can rotate drive wheel 386 in two directions, as shown by an arrow 390. Worm gear drive motor 382 can be embodied as a DC drive motor. Drive belt 392 is coupled between drive wheel 386 and nut wheel 388. As drive wheel 386 rotates, drive belt 392 causes nut wheel 388 to rotate as well. The rotation of nut wheel 388 causes bolt 394 to rotate clockwise or counterclockwise, depending on the direction of rotation of worm gear drive motor 386, thereby moving bolt 394 and non-magnetic plate 402 in the directions of an arrow 410. In one direction (for example the clockwise direction), the rotation of nut wheel 388 causes non-magnetic plate 402 to move closer to a ferromagnetic anchoring surface 406 and in an opposite direction (for example the counterclockwise direction), the rotation of nut wheel 388 causes non-magnetic plate 402 to move further away from ferromagnetic anchoring surface 406. Bolt stopper 396 prevents bolt 394 from rotating beyond the upper end (not labeled) of nut wheel 388. Guiding slot 398 enables guiding pin 400 to move up and down in the direction of arrow 410. Guiding pin 400 is coupled with bolt 394 and guiding slot is a part of bolt housing 408. Guiding pin 400 and guiding slot 398 ensure that bolt 394 moves towards and away from ferromagnetic anchoring surface 406 in a perpendicular direction to the upper surface (not labeled) of ferromagnetic anchoring surface 406. Magnetic parking arms 350 (FIG. 4) and 380 are just two examples of anchoring mechanisms that can be used in the disclosed technique. Other drive mechanisms can be used for embodying the magnetic parking arm as shown above in FIGS. 2A, 4 and 5, including an actuator, a solenoid, a hydraulic piston, a hydraulic motor, a pneumatic compressor and a pneumatic piston. And as mentioned above, other configurations for the drive mechanism and the anchoring mechanism are possible and are a matter of design choice.

As described above in FIG. 4, when an ARC (not shown) receives a park or dock command, the processor (not shown) of the ARC determines the closest anchoring surface and then selects the anchoring surface the ARC should anchor at by providing signals to the drive motors of the ARC to move it to the closest anchoring surface. Once positioned on the anchoring surface, the processor sends a signal to worm gear drive motor 382 to rotate, thereby rotating drive wheel 386, drive belt 392 and nut wheel 388 to move bolt 394 towards ferromagnetic anchoring surface 406 such that magnetic end pieces 404 can magnetically engage with ferromagnetic anchoring surface 406. When the inclement weather or windy conditions pass, the processor sends another signal to worm gear drive motor 382 to rotate in the opposite direction, thereby disengaging magnetic end pieces 404 from ferromagnetic anchoring surface 406 so that the ARC can continue its cleaning cycle. As mentioned above, the magnetic coupling between magnetic end pieces 404 and ferromagnetic anchoring surface 406 can also form an electric connection such the rechargeable battery or power source (not shown) of the ARC can be recharged when magnetic parking arm 380 is engaged.

The disclosed technique regarding a system and method for magnetically parking and anchoring a robotic cleaner on a solar tracker described above has been described using the example of an autonomous robotic cleaner as depicted in FIGS. 2A, 2B and 3 along with a solar tracker as shown in FIG. 1. However the disclosed technique is not limited to that particular ARC and can be used with any cleaning type robot for cleaning the surface of solar panels which may need to be docked and anchored during inclement weather. The ARC may include at least one known cleaning mechanism for cleaning the surface of a solar panel. For example, the ARC may clean the surface of a solar panel using water, a cleaning agent or liquid or may clean the surface of the solar panel without water (i.e., waterlessly) using vacuum, brushes, microfiber fins, a directional air flow, a pressurized air stream, at least one wiper and the like. In addition, even though the disclosed technique was shown using the example of a solar tracker that can change angles according to the position of the sun, the disclosed technique can also be used in solar parks having fixed angle solar panels (for example, solar panels that have a fixed angle of up to about 10-15 degrees from the horizontal). In the case of using the disclosed technique in a solar park with fixed angle solar panels, docking stations or parking stations may be positioned along the length of the solar panels such that an ARC can dock and/or park in any of these stations. In addition, each docking station or parking station might be embodied to form an electric connection when the magnetic connection is made thereby enabling the ARC to recharge its power source. Furthermore, as mentioned above, the disclosed technique relates to forming a magnetic coupling between an ARC and a docking station, parking bay, bridge or anchoring surface. The permanent magnet may be present on the ARC with the anchoring surface being ferromagnetic or vice-versa, the magnet may be present on the anchoring surface with an element on the ARC being ferromagnetic that can couple with the anchoring surface. Three examples of parking arms (parking arm 250 in FIG. 2A, magnetic parking arm 350 in FIG. 4 and magnetic parking arm 380 in FIG. 5) for coupling an ARC magnetically to an anchoring surface were shown above however other designs, configurations and mechanisms are possible. It is also noted that the magnetic coupling described in the disclosed technique can be used not only when there is inclement weather in the vicinity of the solar park but also regularly when an ARC finishes its cleaning cycle and docks and parks in its docking station. The magnetic coupling of the disclosed technique is thus used to anchor the ARC whether it has just finished a cleaning cycle or whether during a cleaning cycle, the cleaning cycle needs to be stopped because of inclement weather.

It will be appreciated by persons skilled in the art that the disclosed technique is not limited to what has been particularly shown and described hereinabove. Rather the scope of the disclosed technique is defined only by the claims, which follow.

The invention claimed is:
1. Autonomous robotic cleaner (ARC) for cleaning solar panels having an anchoring mechanism comprising:
   at least one rechargeable power source;
   at least one cleaning mechanism, for cleaning dirt off of a non-ferromagnetic surface of said solar panels;
   a controller, for controlling a cleaning process of said ARC;
   a supporting structure for supporting a rear end of said ARC; and
   an anchoring mechanism, for magnetically anchoring said ARC to a ferromagnetic anchoring surface coupled with a solar panel,
   said anchoring mechanism comprising:

an arm comprising at least one ferromagnetic end piece; and a drive mechanism, coupled with said arm, wherein said drive mechanism moves said arm between a magnetically engaged position with said ferromagnetic anchoring surface for parking said ARC and a magnetically disengaged position with said ferromagnetic anchoring surface for enabling said ARC to clean said solar panels; and wherein said arm is longer than a height of said supporting structure when said arm is in said magnetically engaged position, thereby lifting said supporting structure off of said ferromagnetic anchoring surface and preventing movement of said ARC.

2. The ARC according to claim 1, wherein said at least one cleaning mechanism is selected from the list consisting of:

a cleaning mechanism utilizing water;
a cleaning mechanism utilizing a cleaning agent;
a cleaning mechanism utilizing a liquid;
a cleaning mechanism utilizing vacuum;
a cleaning mechanism comprising brushes;
a cleaning mechanism comprising microfiber fins;
a cleaning mechanism generating a directional air flow;
a cleaning mechanism generating a pressurized air stream; and
a cleaning mechanism comprising at least one wiper.

3. The ARC according to claim 1, wherein said drive mechanism is selected from the list consisting of:

a drive motor comprising a rotating shaft;
an electronic piston;
an actuator;
a worm gear comprising a bolt and a nut wheel;
a solenoid;
a hydraulic piston;
a hydraulic motor;
a pneumatic compressor; and
a pneumatic piston.

4. The ARC according to claim 1, wherein said at least one ferromagnetic end piece is a permanent magnet and wherein said ferromagnetic anchoring surface is made from a ferromagnetic material.

5. The ARC according to claim 1, wherein said at least one ferromagnetic end piece is made from a ferromagnetic material and wherein said ferromagnetic anchoring surface comprises at least one permanent magnet.

6. The ARC according to claim 1, wherein said at least one ferromagnetic end piece is made from a ferromagnetic material selected from the list consisting of:

galvanized steel;
cobalt;
iron;
ferric oxide;
nickel;
chromium dioxide;
gadolinium;
samarium-cobalt;
neodymium;
permalloy;
magnetite;
rare earth metal magnet material;
alloys of the above listed materials; and
compositions of the above listed materials.

7. The ARC according to claim 1, wherein said supporting structure is selected from the list consisting of:

a swivel wheel;
a brush;
a piece of plastic; and
a piece of rubber.

8. The ARC according to claim 1, wherein said controller is for transmitting and receiving signals to and from said ARC.

9. A solar tracker cleaning system for cleaning solar panels of a solar tracker under varying weather conditions, said solar tracker being able to be positioned at a predetermined angle, said solar tracker cleaning system comprising:

a plurality of ferromagnetic anchoring stations, coupled with at least one edge of said solar tracker;
an autonomous robotic cleaner (ARC); and
a master controller, for receiving and transmitting data to and from said solar tracker and said ARC, said ARC comprising:

at least one rechargeable power source;
at least one cleaning mechanism, for cleaning dirt off of a surface of said solar panels;
a controller, for controlling a cleaning process of said ARC; and
an anchoring mechanism, for magnetically anchoring said ARC to at least one of said plurality of ferromagnetic anchoring stations, said anchoring mechanism comprising:

an arm comprising at least one ferromagnetic end piece; and
a drive mechanism, coupled with said arm, wherein said drive mechanism moves said arm between a magnetically engaged position and a magnetically disengaged position with said at least one of said plurality of ferromagnetic anchoring stations;

wherein said master controller determines a weather condition and provides a clean command to said ARC if said determined weather condition is below a predetermined threshold; and wherein said master controller provides an anchoring command to said ARC to anchor in one of said at least one of said plurality of ferromagnetic anchoring stations if said determined weather condition is above said predetermined threshold.

10. The solar tracker cleaning system according to claim 9, wherein said master controller provides said anchoring command to said ARC after said ARC finishes a cleaning cycle of said solar panels.

11. The solar tracker cleaning system according to claim 9, wherein said plurality of ferromagnetic anchoring stations is selected from the list consisting of:

a parking bay;
a docking station; and
a bridge coupling at two least sections of said solar tracker.

12. The solar tracker cleaning system according to claim 9, wherein said master controller determines said weather condition via a weather information center.

13. The solar tracker cleaning system according to claim 9, further comprising at least one weather instrument for determining said weather condition.

14. The solar tracker cleaning system according to claim 13, wherein said at least one weather instrument is selected from the list consisting of:

a barometer;
a hygrometer;
an anemometer; and
a thermometer.

15. The solar tracker cleaning system according to claim 9, wherein said weather condition is selected from the list consisting of:
   peak gust wind speed;
   a lightning storm;
   rain;
   snow; and
   inclement weather.

16. The solar tracker cleaning system according to claim 9, wherein said master controller determines and selects said one of said at least one of said plurality of ferromagnetic anchoring stations said ARC is to anchor to if said determined weather condition is above said predetermined threshold using a shortest path algorithm.

17. The solar tracker cleaning system according to claim 9, wherein said predetermined threshold is a peak gust wind speed.

18. The solar tracker cleaning system according to claim 9, wherein said drive mechanism is selected from the list consisting of:
   a drive motor comprising a rotating shaft;
   an electronic piston;
   an actuator;
   a worm gear comprising a bolt and a nut wheel;
   a solenoid;
   a hydraulic piston;
   a hydraulic motor;
   a pneumatic compressor; and
   a pneumatic piston.

19. The solar tracker cleaning system according to claim 9, wherein said at least one ferromagnetic end piece is a permanent magnet and wherein said plurality of ferromagnetic anchoring stations is made from a ferromagnetic material.

20. The solar tracker cleaning system according to claim 9, wherein said at least one ferromagnetic end piece is made from a ferromagnetic material and wherein said plurality of ferromagnetic anchoring stations each comprise at least one permanent magnet.

21. The solar tracker cleaning system according to claim 9, wherein said controller is for transmitting and receiving signals to and from said ARC.

22. A fixed angle solar panel cleaning system for cleaning solar panels under varying weather conditions, said solar panels being positioned at a pre-determined angle, said fixed angle solar panel cleaning system comprising:
   a plurality of ferromagnetic anchoring stations, coupled with at least one edge of said solar panels;
   an autonomous robotic cleaner (ARC); and
   a master controller, for receiving and transmitting data to and from said ARC,
   said ARC comprising:
   at least one rechargeable power source;
   at least one cleaning mechanism, for cleaning dirt off of a surface of said solar panels;
   a controller, for controlling a cleaning process of said ARC; and
   an anchoring mechanism, for magnetically anchoring said ARC to at least one of said plurality of ferromagnetic anchoring stations,
   said anchoring mechanism comprising:
   an arm comprising at least one ferromagnetic end piece; and
   a drive mechanism, coupled with said arm,
   wherein said drive mechanism moves said arm between a magnetically engaged position and a magnetically disengaged position with said at least one of said plurality of ferromagnetic anchoring stations;
   wherein said master controller determines a weather condition and provides a clean command to said ARC if said determined weather condition is below a predetermined threshold; and
   wherein said master controller provides an anchoring command to said ARC to anchor in one of said at least one of said plurality of ferromagnetic anchoring stations if said determined weather condition is above said predetermined threshold.

23. The fixed angle solar panel cleaning system according to claim 22, wherein said master controller provides said anchoring command to said ARC after said ARC finishes a cleaning cycle of said solar panels.

* * * * *